US006264082B1

(12) United States Patent
Lindell

(10) Patent No.: US 6,264,082 B1
(45) Date of Patent: Jul. 24, 2001

(54) ROOF-RACK ARRANGEMENT FOR A MOTOR VEHICLE

(75) Inventor: Morgan Lindell, Värnamo (SE)

(73) Assignee: Industri AB Thule, Hillerstorp (SE)

( * ) Notice: Subject to any disclaimer, the term of this patent is extended or adjusted under 35 U.S.C. 154(b) by 0 days.

(21) Appl. No.: 09/491,281

(22) Filed: Jan. 26, 2000

(30) Foreign Application Priority Data

Jan. 29, 1999 (SE) .................................................. 9900324

(51) Int. Cl.[7] .................................................. B60R 9/052
(52) U.S. Cl. ........................... 224/322; 224/331; 439/34
(58) Field of Search .................................. 224/315, 321, 224/322, 328, 329, 330, 331, 545, 546, 547, 555, 557; 439/34

(56) References Cited

U.S. PATENT DOCUMENTS

| 4,264,025 | * | 4/1981 | Ferguson et al. | 224/322 X |
| 4,469,261 | | 9/1984 | Stapleton et al. | |
| 4,640,450 | * | 2/1987 | Gallion et al. | 224/315 X |
| 5,306,156 | * | 4/1994 | Gibbs et al. | 224/315 X |
| 5,624,266 | * | 4/1997 | Gibbs et al. | 224/315 X |
| 5,826,765 | * | 10/1998 | Rak et al. | 224/321 |

FOREIGN PATENT DOCUMENTS

| 4402217 | 1/1994 | (DE) . |
| 19652297 | 12/1996 | (DE) . |
| 9101136 | 2/1991 | (FR) . |

* cited by examiner

Primary Examiner—Stephen K. Cronin
(74) Attorney, Agent, or Firm—Samuels, Gauthier & Stevens, LLP

(57) ABSTRACT

A roof-rack arrangement for a motor vehicle, including at least one load-bearing bar extending across the roof, a pair of feet, one arranged at each end of the bar, for fastening the load-bearing bar on top of the roof of the vehicle, which feet each have their own support portion for clamping to the respective side portion of the roof, and, arranged on each foot, a bolt connection which extends through a bolt hole in the support portions, is fixed to the roof in an anchoring member and is arranged so as to make possible, by tightening, secure clamping of the support portion between a flange portion of the bolt connection. The flange portion is located on top of the support portion, and the anchoring member. An expander element is arranged between the flange portion and the support portion.

6 Claims, 3 Drawing Sheets

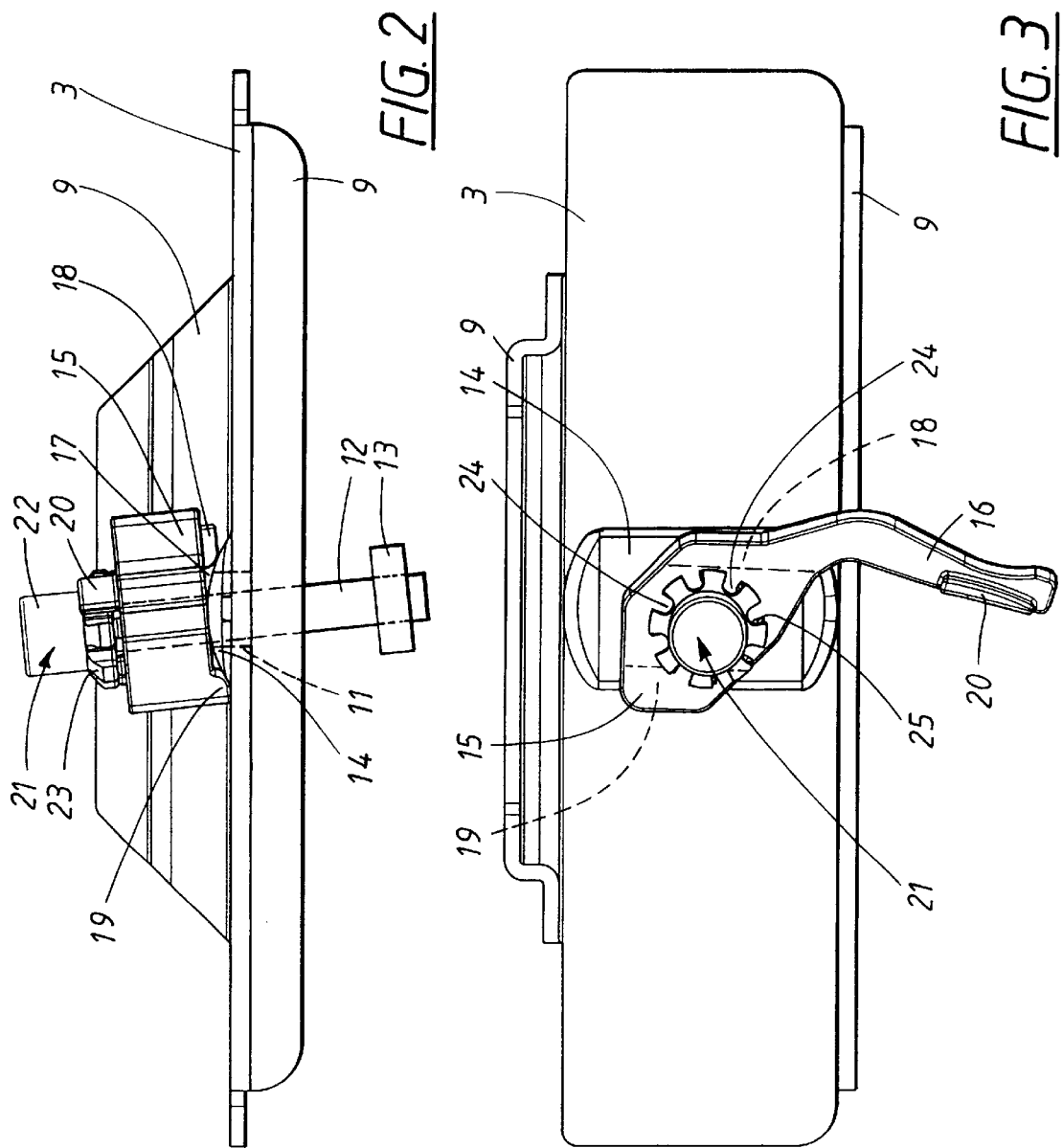

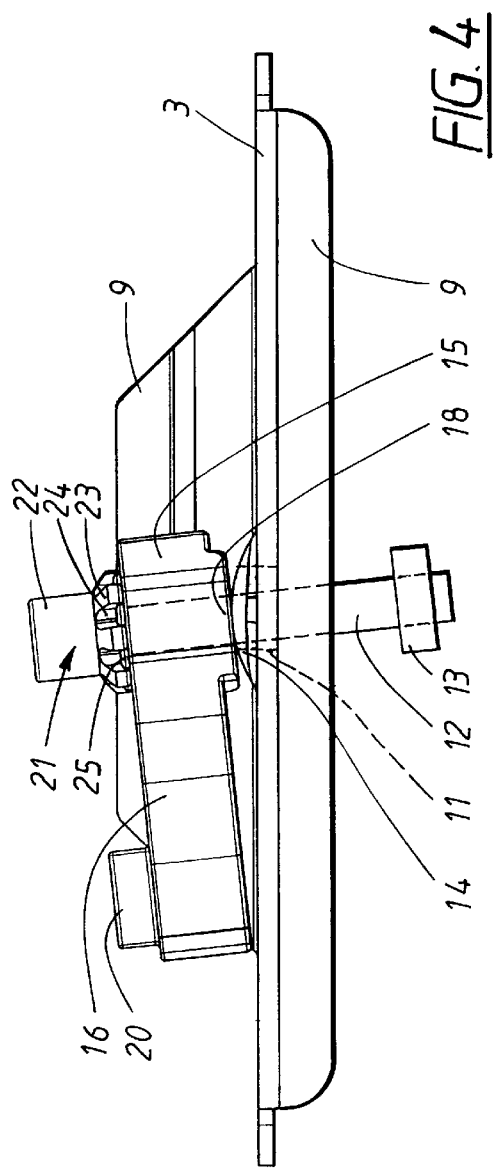
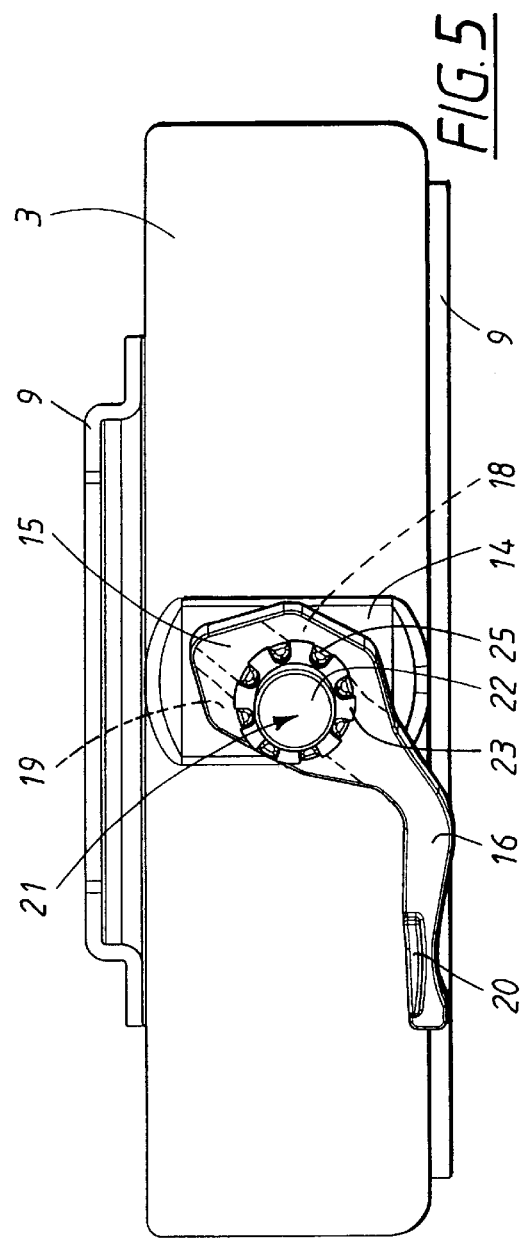

ROOF-RACK ARRANGEMENT FOR A MOTOR VEHICLE

TECHNICAL FIELD

The present invention relates to a roof-rack arrangement for a motor vehicle, which comprises at least one load-bearing bar extending across the roof, two feet, one arranged at each end of the bar, for fastening the load-bearing bar on top of the roof of the vehicle, which feet each have their own support portion for clamping to the respective side portion of the roof, and, arranged on each foot, a threaded bolt connection which extends through a bolt hole in the support portions, is fixed to the roof in anchoring means and is arranged so as to make possible, by manual tightening of the bolt connection, secure clamping of the support portion between a flange portion of the bolt connection, which flange portion is located on top of the support portion, and the anchoring means.

STATE OF THE ART

A known arrangement for fixing roof-racks to car roofs comprises fixed nuts arranged at the edge portions of the roof, which are intended to serve as anchoring means for bolts which are threaded in from above through bolt holes in the feet of the roof-rack. The bolts are screwed in, normally by hand, until a flange portion, usually in the form of a bolt head, comes to bear against the top side of the foot, and a final tightening is carried out, in most cases using a tool, in order to clamp the foot securely against the roof. It is usual for the foot to rest on a pad made of an elastic material such as, for example, rubber, so that adaptation to the shape of the roof is obtained and moreover a connection with appropriate clamping force results. There are also constructional solutions in which the bolt head, which may be of any suitable type besides hexagonal, is hooked into arrangements on the roof, in some cases with some type of corresponding keyhole mounting, and a threaded end on the bolt is pushed up through a bolt hole in the foot, on the top side of which a nut with a flange portion is screwed on and tightened in a corresponding manner.

In these constructions, it is a disadvantage that a tool, which is in most cases loose, is required in order to achieve adequate clamping force for the connection. Furthermore, the grip of the tool may have to be changed during handling, which sometimes results in poor purchase and slipping. The working position in this situation, with the point of working on top of the roof of a vehicle, is also inconvenient, it being difficult to see what is being done.

DESCRIPTION OF THE INVENTION

The above problems have been solved in an elegant manner according to the invention by the addition of an expander element arranged between the flange portion and the support portion. In a relatively inexpensive and simple embodiment of the invention, the expander element includes an essentially annular member with an opening for the bolt connection, which member is arranged essentially coaxially with the bolt connection and the lower surface of which, that facing the support portion, is designed rotationally unsymmetrically in relation to the axis of the bolt connection and arranged so as to interact with a corresponding, rotationally unsymmetrical surface on the support portion in such a manner that the annular member and the support portion, when relative rotation takes place between the two in one direction or the other, move further from or, respectively, closer to one another. In an almost self-locking variant of the rotational symmetrical surfaces, the top side of the support portion, that facing the annular member, is provided with a ridge extending across the opening for the bolt connection, and the annular member is, on its side facing the support portion, provided with an indentation extending diagonally across the opening for the bolt connection, and two cams located one on each side of the indentation, the annular member being rotatable between two positions, one in which the ridge rests in the indentation, a readiness position, and one in which the cams rest on the ridge, essentially across the latter, an expanded position. So as to be more easily operable, the annular member is suitably provided with an operating lever which can also be used in order to prevent a protective cover being put on without the rack having been securely clamped. The cover can on the other hand safeguard the connection against coming undone by preventing, via locking the lever, rotation of the annular member back to the readiness position. Furthermore, the flange portion can be provided with first gripping means which are arranged so as, when the bolt is fully screwed in or the nut is fully screwed on, to interact with corresponding second gripping means on the top side of the annular member in such a manner that rotation of the annular member with the gripping means in engagement with one another brings about corresponding rotation of the bolt or the nut and further tightening of the bolt connection.

Other advantages and features of the invention will emerge from the description of the invention given below.

DESCRIPTION OF THE FIGURES

The invention will be described in greater detail below and explained with reference to the exemplary embodiment which is shown in the appended drawings, in which FIGS. 2 and 3 show a support portion of a foot with an expander mechanism according to the invention in the readiness position from the side and, respectively, from above relative to the roof of the vehicle, and FIGS. 4 and 5 show a support portion corresponding to that in FIGS. 2 and, respectively, 3, but with the expander mechanism in the expanded position, from the side and, respectively, from above.

PREFERRED EMBODIMENT

Figure 1:
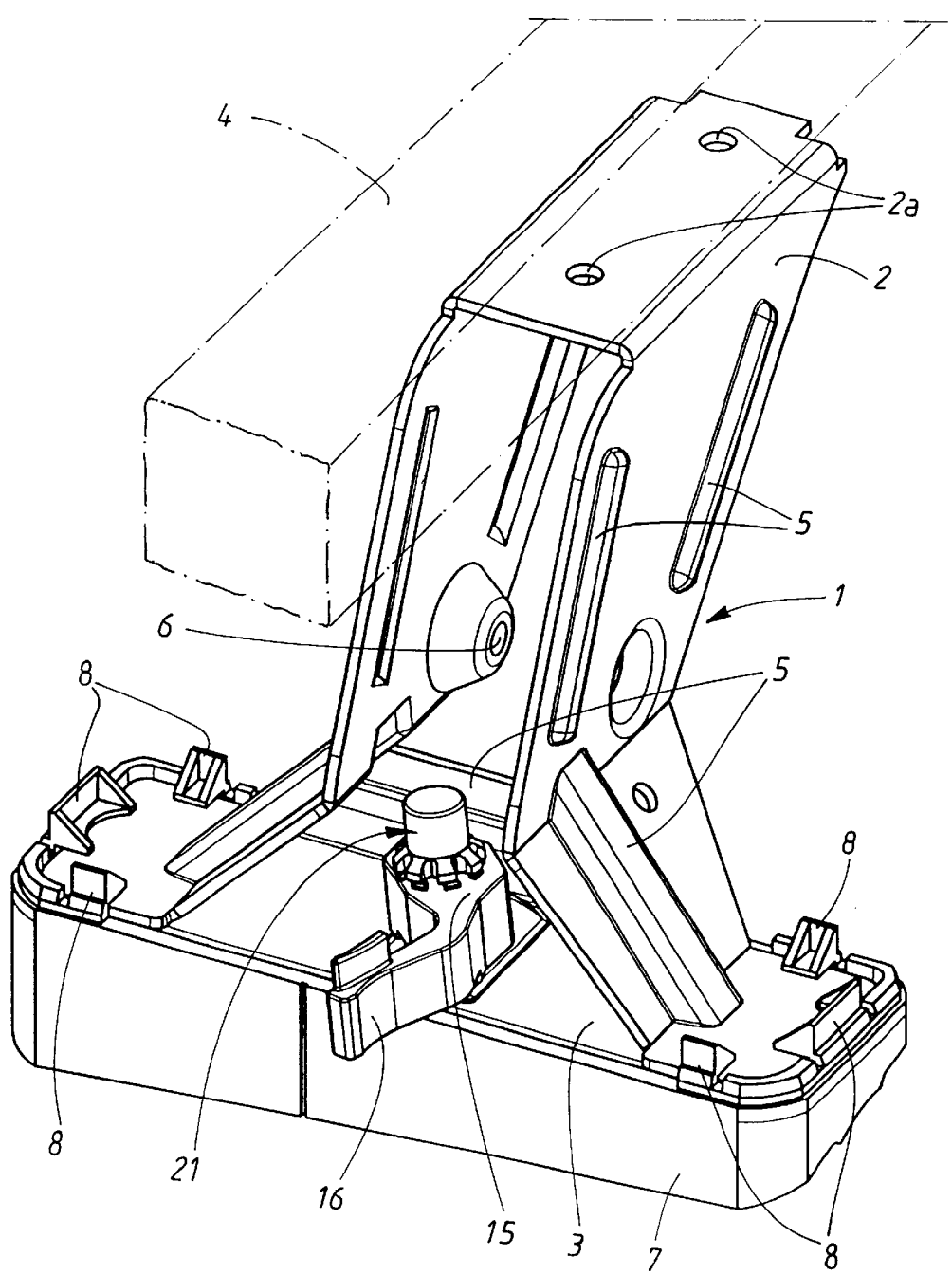
FIG. 1 is a perspective view of a foot for a roof-rack according to the invention.

As can be seen from FIG. 1, the roof-rack arrangement according to the invention includes a foot 1, made from pressed sheet metal, with an upper bracket 2 and a lower support plate 3. The support plate 3 is fixed to the end portions of the bracket 2 by rivets. It is also possible to spot weld. There is also a load-bearing member 4, shown by dot/dash lines as it is not of significance to the invention, and also a similar foot (not shown) on the other side of the load-bearing member. The feet can be fixed to the load-bearing member by bolt connections or rivet connections (not shown) through holes 2a. The foot 1 is provided with a number of rigidifying profiles 5 and fixing holes 6, some made by hole punching and bending partly cut-out portions and some made by stamping in tools, but the profiles are not to be discussed in greater detail here because they are not of significance to the invention. Arranged below the support plate 3 is a rubber foot 7 which is retained on the support plate by means of hooks 8 integrated in the rubber foot. The support plate 3 is also provided with bent portions 9 which have a rigidifying function.

Arranged in the central portion of the support plate is a bolt hole 11 (shown in dot/dash lines in FIGS. 2 and 4)

which is oblong along the support plate and through which a fixing bolt 12 extends. The fixing bolt 12 is threaded at its lower end in the figure and is screwed into a diagrammatically represented roof nut 13 which is in turn fixed to a vehicle roof. The nut 13 is suitably welded to the roof of the vehicle (not shown).

At the bolt hole 11, there is in the support plate 3 a rounded stamped portion 14 in the form of a ridge-like formation which extends across the support plate over the bolt hole. An essentially annular member, an expander element 15, which is provided with a hole for the fixing bolt 12 and an operating lever 16, rests against and interacts with the stamped portion 14. The expander element 15, which is suitably moulded in plastic, is on its underside, which bears against the stamped portion 14 of the support plate 3, provided with an indentation or raised portion 17 and two essentially parallel cams 18 and 19, one located on each side of the raised portion 17. Said portion extends across the hole for the bolt in the expander element 15.

The operating lever 16 is provided with a gripping lug 20. The bolt is provided at its upper end with a bolt head 21, the design of which, as can be seen from the figures, is special and will be explained below.

The attachment of the roof-rack arrangement is carried out as follows. The roof-rack arrangement normally consists of two loading frames with associated feet and load-bearing members but, as all the feet are fastened in the same manner, the procedure for only one of the feet is described here. The fixing bolt 12 is guided through the hole 14 in the support plate, through the hole in the expander element 15 and is screwed by hand into the roof nut 13 until the bolt head 21 bears closely against the expander element 15, normally against projections which are arranged on the top side of the expander element and will be explained in greater detail below. The support plate will then rest closely against the roof of the vehicle via the rubber foot 7.

In FIGS. 2 and 3, the arrangement is shown with the expander element in the readiness position, that is to say the cams 18 and 19 rest one on each side of the stamped portion 14 which lies parallel to and in the raised portion 17. The operating arm 16 is angled out from the support plate 3.

The final stage in the locking is then for the operating arm 16 to be rotated to the left in FIGS. 2 and 3, so that the expander element 15 and the operating arm 16 take up the position shown in FIGS. 4 and 5. In these figures, it can be seen that the expander element has taken up an expander position in which the cams 18 and 19 (the latter concealed) ride on top of the stamped portion 14 and across it, and the operating lever 16 has taken up a position essentially parallel to the longitudinal direction of and above the support plate. During rotation, the expander element has been lifted up from the support plate 3, and the connection with the fixing bolt 12 and the roof nut 13 has been clamped adequately. The height of the stamped portion 14 and of the cams 18 and 19 determines the magnitude of the clamping force, and the selection of these parameters is of course to be made on the basis of the dimensions of the component parts, not least the thickness of the rubber foot.

An advantage of the ridge-shaped stamped portion running across the support plate and the cams resting thereon is that a cradle with two points of support results, which cradle can accommodate angular variations of the fixing bolt in relation to a line in the longitudinal direction of the support plate, that is to say the longitudinal direction of the vehicle.

It is known to provide roof-racks with foot covers to protect mechanisms in the feet and to prevent the racks from being stolen. Covers are also added for design reasons. In this respect, it is an advantage if the cover cannot be put on when the roof-rack is not securely clamped. It is also an advantage if the rack cannot be released/come loose when the cover is on. The construction of the operating lever 16 on the expander element and thus its position in the readiness position and the expander position of the expander element 15 are selected so as to prevent a cover being put on and, respectively, rotation back to the readiness position when a cover has been put on.

The bolt head 21 is designed with a round top 22 and a flange 23. The flange 23 is provided around its periphery with equidistant recesses 24. The recesses 24 correspond to moulded projections or "pimples" 25 on the expander element 15, which are likewise distributed equidistantly in a ring around the bolt hole in the expander element.

The recesses 24 in the flange 23 are arranged so as to interact with the projections 25 on the expander element in such a manner that the projections 25 come into or virtually into engagement with the recesses 24 when the fixing bolt has been rotated closely against the expander element. When the expander element has, by means of the operating lever 16, been rotated to the expander position, the fixing bolt 12 is carried along with the rotation, because the projections 25, if they are not already in engagement with the recesses 24 in the first stage of rotation, enter into engagement and subsequently rotate with the bolt. The thread direction of the fixing bolt and of the roof nut is in this respect selected in such a manner that the bolt connection is tightened further when this rotation takes place. Furthermore, the fixing bolt is in this way prevented from rotating out of its tightened and securely clamped position, that is to say mechanical locking is brought about.

The invention described above is not limited to the exemplary embodiment described above and shown in the drawings, but numerous variants are possible within the scope of the patent claims below. For example, the attachment to the vehicle roof can consist of hook means for the fixing bolts, which then also have hooks at one end, and the material of the component parts can of course also be varied. The interacting surfaces on the expander element and the support plate can be designed in other ways, for example a screw-spiral shape can be used or the stamped portion in the support plate can be directed downwards and the expander element can be provided with a ridge. The recesses on the bolt head 21, which can per se be considered to be a nut on a fixing bolt thread where the bolt head is fixed to the roof, and the projections 25 can be replaced by, for example, radially extending cams on the flange and corresponding hollows in the expander element. A cover which can be put on and which interacts with the operating lever can be designed in a great many different ways by an expert in the field.

The head of the bolt can also be provided with gripping grooves in order to be more easily rotatable by hand. The bolt hole 11 does not have to be oblong, it only has to allow the bolt 12 to be inclined in different directions in the hole.

When the expander element is of the type having a hole, which is penetrated by the bolt, it is also possible to arrange a retaining means, like a secured washer, on the part of the bolt situated underneath the support portion of the foot, which retaining means prevents the bolt and expander element from separating from the foot when not mounted on a car.

What is claimed is:

1. A roof-rack arrangement for a motor vehicle, comprising:

at least one load-bearing bar extending across the roof, a pair of feet, one arranged at each end of the bar, for fastening the load bearing bar on top of the roof of the vehicle, which feet each have their own support portion for clamping to the respective side portion of the roof, arranged on each foot, a threaded bolt connection which extends through a bolt hole in the support portions, which is fixed to the roof in an anchoring member and which is arranged so as to make possible, by manual tightening of the bolt connection, secure clamping of the support portion between flange portion of the bolt connection, which flange portion is located on top of the support portion, and the anchoring member, and an expander mechanism arranged between the flange portion and the support portion, the expander mechanism including an essentially annular expander element with an opening for the bolt connection, which element is arranged coaxially with the bolt connection and the lower surface of which, that facing the support portion, is designed rotationally unsymmetrically in relation to the axis of the bolt connection and arranged so as to interact with a corresponding, rotationally unsymmetrical surface on the support portion in such a manner that the expander mechanism and the support portion, when relative rotation takes place between the two in one direction or the other, move further from or, respectively, closer to one another.

2. Roof-rack arrangement according to claim 1, wherein the flange portion is arranged so as to, on tightening, bear directly against the expander element and those portions of the flange portion and the expander element which bear against one another are designed with engagement means which correspond to one another and which, when the bolt connection has been tightened and the expander element is in the readiness position, are arranged so as to serve as rotation drivers for the flange portion on rotation of the expander element to the expanded position and vice versa, and wherein the direction of rotation from the readiness position to the expander position coincides with a direction of rotation which tightens the bolt connection, the engagement means thus being arranged so as to provide mechanical locking in the expander position.

3. Roof-rack arrangement according to claim 1, wherein the top side of the support portion, that facing the expander element, is provided with a ridge extending across the opening for the bolt connection, and wherein the expander element is, on its side facing the support portion, provided with an indentation extending diagonally across the opening for the bolt connection and two cams located one on each side of the indentation, the expander element being rotatable between two positions, one in which the ridge rests in the indentation, a readiness position, and one in which the cams rest on the ridge, essentially across the latter, an expander position.

4. Roof-rack arrangement according to claim 3, wherein the flange portion is arranged so as to, on tightening, bear directly against the expander element and those portions of the flange portion and the expander element which bear against one another are designed with engagement means which correspond to one another and which, when the bolt connection has been tightened and the expander element is in the readiness position, are arranged so as to serve as rotation drivers for the flange portion on rotation of the expander element to the expanded position and vice versa, and wherein the direction of rotation from the readiness position to the expander position coincides with a direction of rotation which tightens the bolt connection, the engagement means thus being arranged so as to provide mechanical locking in the expander position.

5. Roof-rack arrangement according to claim 1, wherein the expander element is provided with an operating lever.

6. Roof-rack arrangement according to claim 5, the feet being provided with a cover which can be taken off and put on and is intended to protect the foot and its mechanism, wherein the operating lever is arranged so as, in the expander position, to take up a folded-aside position within the extent of the cover, from which its rotation to the readiness position is prevented by the cover when it has been put on, and in that, with the expander element in the readiness position, the operating lever is arranged so as to project beyond the extent of the cover in order to prevent the cover from being put on.

\* \* \* \* \*